(12) United States Patent
Coraluppi

(10) Patent No.: US 10,579,337 B1
(45) Date of Patent: Mar. 3, 2020

(54) METHOD, SOFTWARE AND APPARATUS FOR COMPUTING DISCRETE LOGARITHMS MODULO A PRIME

(71) Applicant: Giorgio Coraluppi, Pittsburgh, PA (US)

(72) Inventor: Giorgio Coraluppi, Pittsburgh, PA (US)

(73) Assignee: Chorus Call, Inc., Monroeville, PA (US)

( * ) Notice: Subject to any disclaimer, the term of this patent is extended or adjusted under 35 U.S.C. 154(b) by 0 days.

(21) Appl. No.: 15/875,737

(22) Filed: Jan. 19, 2018

Related U.S. Application Data

(63) Continuation-in-part of application No. 14/886,404, filed on Oct. 19, 2015, now abandoned.

(60) Provisional application No. 62/181,322, filed on Jun. 18, 2015.

(51) Int. Cl.
| | |
|---|---|
| *H04L 9/12* | (2006.01) |
| *H04L 9/28* | (2006.01) |
| *G06F 7/556* | (2006.01) |
| *G06F 7/72* | (2006.01) |
| *G06F 7/552* | (2006.01) |
| *G06F 7/483* | (2006.01) |
| *G06F 17/11* | (2006.01) |

(52) U.S. Cl.
CPC .......... *G06F 7/556* (2013.01); *G06F 7/4833* (2013.01); *G06F 7/552* (2013.01); *G06F 7/72* (2013.01); *G06F 17/11* (2013.01)

(58) Field of Classification Search
CPC ........ G06F 7/556; G06F 7/4833; G06F 7/552; G06F 7/72; G06F 21/10; H04L 9/06; H04L 9/008; H04L 9/3013
See application file for complete search history.

(56) References Cited

U.S. PATENT DOCUMENTS

| | | | | |
|---|---|---|---|---|
| 7,076,061 B1* | 7/2006 | Lenstra | ................. | H04L 9/3013 380/28 |
| 2003/0191946 A1* | 10/2003 | Auer | ................. | G06F 21/10 713/182 |
| 2007/0118746 A1* | 5/2007 | Lauter | ................. | H04L 9/008 713/170 |
| 2007/0192622 A1* | 8/2007 | Futa | ................. | G06F 7/72 713/189 |
| 2008/0072055 A1* | 3/2008 | Volkovs | ................. | H04L 9/3013 713/180 |
| 2010/0046741 A1* | 2/2010 | Isogai | ................. | H04L 9/3013 380/28 |

(Continued)

OTHER PUBLICATIONS

Polynomial-Time Algorithms for Prime Factorization and Discrete Logarithms on a Quantum Computer, Peter W. Shor, IEEE (Year: 1994).*

*Primary Examiner* — Shanto Abedin

(74) *Attorney, Agent, or Firm* — Ansel M. Schwartz

(57) ABSTRACT

A decoding apparatus having a non-transient memory in which is stored an electromagnetic signal representative of data which were encrypted relying on the difficulty of computing discrete logarithms. The decoding apparatus has a computer in communication with the memory that decodes the encrypted data in the memory by computing the data's discrete logarithm. The decoding apparatus has a display on which the decoded encrypted data are displayed by the computer. A method for decoding.

3 Claims, 2 Drawing Sheets

(56) References Cited

U.S. PATENT DOCUMENTS

2010/0046746 A1* 2/2010 Yonemura ............ H04L 9/3013
380/30
2012/0311005 A1* 12/2012 Cheon .................... G06F 7/724
708/235

* cited by examiner

REPRESENTATION OF $\rho_1{}^{x_1} \cdot \rho_2{}^{x_2} \pmod{70}$

USING ORTHOGONAL PRIMITIVES

METHOD, SOFTWARE AND APPARATUS FOR COMPUTING DISCRETE LOGARITHMS MODULO A PRIME

CROSS-REFERENCE TO RELATED APPLICATIONS

This is a continuation-in-part of U.S. patent application Ser. No. 14/886,404 filed Oct. 19, 2015, which claims priority from U.S. provisional application Ser. No. 62/181,322 filed on Jun. 18, 2015, both of which are incorporated by reference herein.

I. FIELD OF THE INVENTION

The present invention considers the exponential congruence $$a_0^x \equiv y_0 (\mathrm{mod}\ p) \tag{1}$$

where p is prime and $a_0$ is a primitive root modulo p. Since $a_0$ is primitive, x and $y_0$ are in a one-to-one correspondence for integer values in the range $1 \leq x, y_0 \leq p-1$ [3]. Let G denote the set of integers $\{1, 2, \ldots, p-1\}$ and let |G| denote their number. Given p and $a_0$ and given $y_0$ in G, it is desired to find x modulo p−1. The integer x is usually referred to as the discrete logarithm of $y_0$ in base $a_0$ modulo p. (As used herein, references to the "present invention" or "invention" relate to exemplary embodiments and not necessarily to every embodiment encompassed by the appended claims.)

BACKGROUND OF THE INVENTION

Pohlig and Hellman discussed the significance of this problem for cryptographic systems [3]. It was concluded by Pohlig and Hellman that, if p−1 has only small prime factors, x can be computed in a time of the order of $\log^2 p$. However, if p−1 has a large prime factor p', the search for x requires a time of the order p' ·log p and may be untraceable. As an illustration, Pohlig and Hellman presented two large primes of the form p=2·p'+1, where p' is also prime and where $$p' = 2^{13} \cdot 5 \cdot 7 \cdot 11 \cdot 13 \cdot 17 \cdot 19 \cdot 23 \cdot 29 \cdot 31 \cdot 37 \cdot 41 \cdot 43 \cdot 47 \cdot 530.59 + 1 \tag{2}$$

or $$p' = 2^{121} \cdot 5^2 \cdot 7^2 \cdot 11^2 \cdot 13 \cdot 17 \cdot 19 \cdot 23 \cdot 29 \cdot 31 \cdot 37 \cdot 41 \cdot 43 \cdot 47 \cdot 53 \cdot 59 + 1. \tag{3}$$

In general, let p=2·p'+1, where p' is prime and $$p' - 1 = 2^{\varepsilon_0} \cdot q_1^{\varepsilon_1} \cdot q_2^{\varepsilon_2} \cdot \ldots \cdot q_i^{\varepsilon_i} \cdot \ldots \cdot q_h^{\varepsilon_h}, \tag{4}$$

where $\varepsilon_0 \geq 1$ and, for $1 \leq i \leq h$, $q_1$ denotes an odd prime and $\varepsilon_i > 0$. Also, for $1 \leq i < h$, $2 < q_i < q_{i+1}$.

NOTE 1: Pohlig and Hellman observed that $q_1 \neq 3$. In fact p=2·p'+1=2·(p'−1)+3. Since p is prime, it must be gcd (3, p'−1)=1.

NOTE 2: Let X denote the set of elements of G which are relatively prime to p−1 and let A denote the set of primitive roots modulo p. Then $|X|=|A|=\varphi(p-1)$, where $\varphi(n)$ denotes the Euler totient function.

NOTE 3: The elements of X form a commutative (abelian) group under the operation of multiplication modulo p−1. An integer $m \geq 1$ has a primitive root if and only if m=1, 2, 4, $p^d$ or $2 \cdot p^d$, where p is prime number and a is a positive integer [1, p. 211]. When X is cyclic, there exist integers p which are primitive roots of X modulo p−1. When primitive roots of X exist, let Y denote the set of elements of X which are primitive roots of X modulo p−1.

NOTE 4: Section VIII below shows that, when p'−1 can be described as in (4), X is cyclic only if $\varepsilon_0 < 3$

BRIEF SUMMARY OF THE INVENTION

The present invention introduces an algorithm which, when p=2·p'+1, p' is prime and p'−1 contains only small prime factors, produces the solution of (1) in a time of the order of log log p·$\log^2$ p.

The present invention pertains to a decoding apparatus. The decoding apparatus comprises a non-transient memory in which is stored an electromagnetic signal representative of data which were encrypted relying on the difficulty of computing discrete logarithms. The decoding apparatus comprises a computer in communication with the memory that decodes the encrypted data in the memory by computing the data's discrete logarithm. The decoding apparatus comprises a display on which the decoded encrypted data are displayed by the computer.

The present invention pertains to a method for processing an electromagnetic signal representative of encrypted data which were produced relying on the difficulty of computer discrete logarithms, comprising a first computer. The method comprises the steps of storing the encrypted data in a non-transient memory of a second computer. There is the step of performing with the second computer in communication with the memory the computer-generated steps of decoding the encrypted data in the memory by computing the data's discrete logarithms, and displaying on a display the decoded data.

The present invention pertains to a computer program stored in a non-transient memory for decoding an electromagnetic signal which is encrypted relying on the difficulty of computing discrete logarithms. The program has the computer-generated steps of storing the encrypted data in a non-transient memory. There is the step of decoding the encrypted data in the memory by computing the data's discrete logarithms. There is the step of displaying on a display the decoded data.

The present invention pertains to a method for reducing the complexity of an exponential congruence, preferably for decoding, which is defined modulo p, where p=2·p'+1, p' is also a prime and p'−1 contains only factors which are smaller than 100,000. The method comprises the steps of executing with a computer a sequence of reversible transformations supported by a non-transient memory in such a way that the exponential congruence modulo p is restated as a problem involving new relationships modulo p and a concurrent independent congruence modulo p−1. There is the step of reporting the restated problem on a display.

The present invention pertains to a method for decoding. The method comprises the steps of selecting with a computer primitives of sub-groups of a group stored in a non-transient memory, where the group is defined modulo $\varphi(p-1)$ in such a way that an exponent of any one primitive is independent on an exponent of any other primitive, thus reducing the complexity of a search for such exponents to a number of operations of the order of a sum of such exponents as opposed to their product. There is the step of reporting the exponents on a display.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
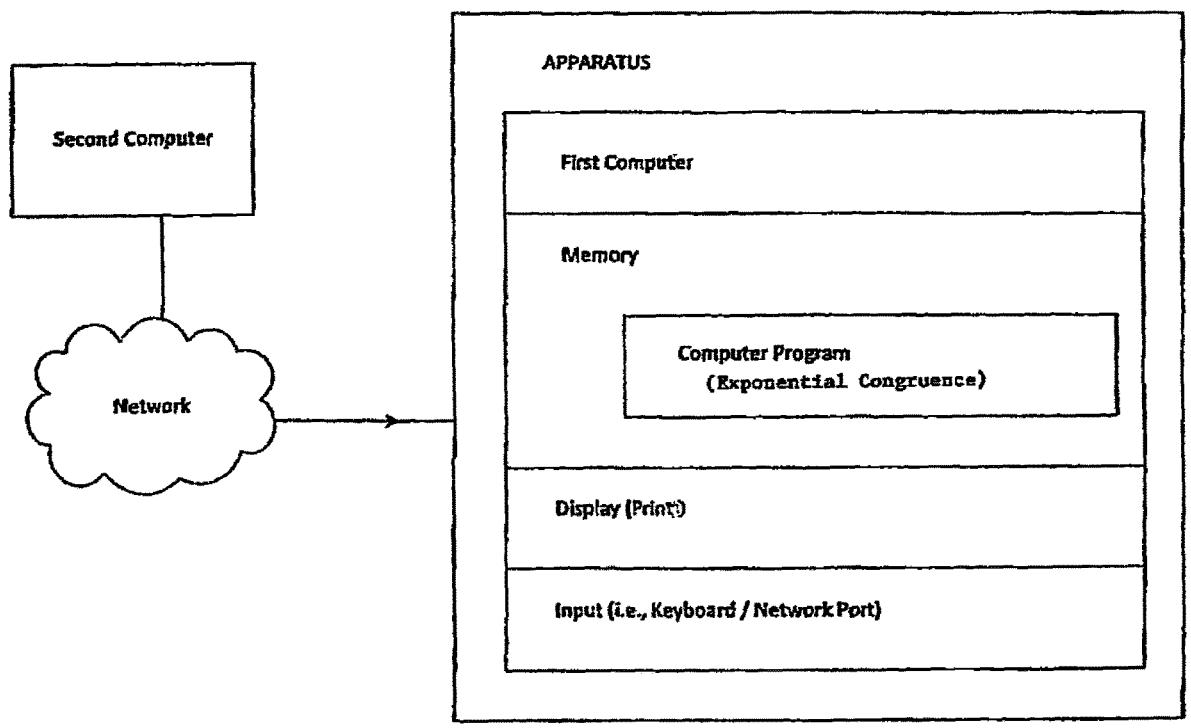
FIG. 1 is a block diagram of the apparatus of the claimed invention.

Referring now to the drawings wherein like reference numerals refer to similar or identical parts throughout the several views, and more specifically to FIG. 1 thereof, there is shown a decoding apparatus 10. The decoding apparatus 10 comprises a non-transient memory 14 in which is stored an electromagnetic signal representative of data which were encrypted relying on the difficulty of computing discrete logarithms. The decoding apparatus 10 comprises a computer 12 in communication with the memory 14 that decodes the encrypted data in the memory 14 by computing the data's discrete logarithm. The decoding apparatus 10 comprises a display 18 on which the decoded encrypted data are displayed by the computer 12.

The computer 12 may reduce the complexity of an exponential congruence which is defined modulo p, where $p=2 \cdot p'+1$, p' is also a prime and p'−1 contains only factors which are smaller than 100,000, and executes a sequence of reversible transformations supported by the non-transient memory 14 in such a way that the exponential congruence modulo p is restated as a problem involving new relationships modulo p and a concurrent independent congruence modulo p−1. The computer 12 may select primitives of sub-groups of a group stored in the non-transient memory 14, where the group is defined modulo $\varphi(p-1)$ in such a way that an exponent of any one primitive is independent on an exponent of any other primitive, thus reducing the complexity of a search for such exponents to a number of operations of the order of a sum of such exponents as opposed to their product.

The present invention pertains to a method for processing an electromagnetic signal representative of encrypted data which were produced relying on the difficulty of computing discrete logarithms. The method comprises the steps of producing the electromagnetic signal by a first computer 12. There is the step of providing the signal to a second computer 22 through an input 20 of the second computer 22. The input 20 can be a keyboard in communication with the second computer 22 or a memory port, such as a USB port that receives a flash drive or a CD reader that receives a CD with the signal; or the input 20 can be a network interface card in communication with the second computer 22 having a network port which is in communication with a network 24 over which the signal is transmitted from the first computer 12. The second computer 22 obtains the signal from the network 24 through the input 20 of the second computer 22. There is the step of storing the encrypted data in a non-transient memory 14 of a second computer 22. There is the step of performing with the second computer 22 in communication with the memory 14 the computer-generated steps of decoding the encrypted data in the memory 14 by computing the data's discrete logarithms, and displaying on a display 18 the decoded data.

The performing step may include the steps of reducing the complexity of an exponential congruence which is defined modulo p, where $p=2 \cdot p'+1$, p' is also a prime and p'−1 contains only factors which are smaller than 100,000. There may be the step of executing with the computer a sequence of reversible transformations supported by a non-transient memory 14 in such a way that the exponential congruence modulo p is restated as a problem involving new relationships modulo p and a concurrent independent congruence modulo p−1. There may be the step of reporting the restated problem on a display 18. The performing step may include the step of selecting with the computer primitives of sub-groups of a group stored in the non-transient memory 14, where the group is defined modulo $\varphi(p-1)$ in such a way that an exponent of any one primitive is independent on an exponent of any other primitive, thus reducing the complexity of a search for such exponents to a number of operations of the order of a sum of such exponents as opposed to their product.

The present invention pertains to a computer program 16 stored in a non-transient memory 14 for decoding an electromagnetic signal which is encrypted relying on the difficulty of computing discrete logarithms. The program has the computer-generated steps of storing the encrypted data in a non-transient memory 14. There is the step of decoding the encrypted data in the memory 14 by computing the data's discrete logarithms. There is the step of displaying on a display 18 the decoded data.

The decoding step may include the steps of reducing the complexity of an exponential congruence which is defined modulo p, where $p=2 \cdot p'+1$, p' is also a prime and p'−1 contains only factors which are smaller than 100,000. There may be the step of executing with the computer a sequence of reversible transformations supported by a non-transient memory 14 in such a way that the exponential congruence modulo p is restated as a problem involving new relationships modulo p and a concurrent independent congruence modulo p−1.

The decoding step may include the steps of selecting with the computer primitives of sub-groups of a group stored in the non-transient memory 14, where the group is defined modulo (p−1) in such a way that an exponent of any one primitive is independent on an exponent of any other primitive, thus reducing the complexity of a search for such exponents to a number of operations of the order of a sum of such exponents as opposed to their product.

The present invention pertains to a method for reducing the complexity of an exponential congruence, preferably for decoding, which is defined modulo p, where $p=2 \cdot p'+1$, p' is also a prime and p'−1 contains only factors which are smaller than 100,000. The method comprises the steps of executing with a computer a sequence of reversible transformations supported by a non-transient memory 14 in such a way that the exponential congruence modulo p is restated as a problem involving new relationships modulo p and a concurrent independent congruence modulo p−1. There is the step of reporting the restated problem on a display 18.

The present invention pertains to an apparatus 10 for reducing the complexity of an exponential congruence, preferably for decoding, which is defined modulo p, where $p=2 \cdot p'+1$, p' is also a prime and p'−1 contains only factors which are smaller than 100,000. The apparatus 10 comprises a non-transient memory 14. The apparatus 10 comprises a computer in communication with the non-transient memory 14 which executes a sequence of reversible transformations supported by the non-transient memory 14 in such a way that the exponential congruence modulo p is restated as a problem involving new relationships modulo p and a concurrent independent congruence modulo p−1. The apparatus 10 comprises a display 18 on which the restated problem is reported.

The present invention pertains to a computer program 16 stored in a non-transient memory 14 for reducing the complexity of an exponential congruence, preferably for decoding, which is defined modulo p, where p=2·p'+1, p' is also a prime and p'−1 contains only factors which are smaller than 100,000. The program comprises the computer generated steps of executing a sequence of reversible transformations supported by a non-transient memory 14 in such a way that the exponential congruence modulo p is restated as a problem involving new relationships modulo p and a concurrent independent congruence modulo p−1. There is the step of reporting the restated problem on a display 18.

The present invention pertains to a method for decoding. The method comprises the steps of selecting with a computer primitives of sub-groups of a group stored in a non-transient memory 14, where the group is defined modulo $\varphi(p-1)$ in such a way that an exponent of any one primitive is independent on an exponent of any other primitive, thus reducing the complexity of a search for such exponents to a number of operations of the order of a sum of such exponents as opposed to their product. There is the step of reporting the exponents on a display 18.

The present invention pertains to a computer program 16 stored in a non-transient memory 14 for decoding. The program comprises the computer generated steps of selecting primitives of sub-groups of a group stored in a non-transient memory 14, where the group is defined modulo $\varphi(p-1)$ in such a way that an exponent of any one primitive is independent on an exponent of any other primitive, thus reducing the complexity of a search for such exponents to a number of operations of the order of a sum of such exponents as opposed to their product. There is the step of reporting the exponents on a display 18.

The present invention pertains to an apparatus 10 for decoding. The apparatus 10 comprises a non-transient memory 14. The apparatus 10 comprises a computer in communication with the memory 14 which selects primitives of sub-groups of a group stored in the non-transient memory 14, where the group is defined modulo $\varphi(p-1)$ in such a way that an exponent of any one primitive is independent on an exponent of any other primitive, thus reducing the complexity of a search for such exponents to a number of operations of the order of a sum of such exponents as opposed to their product. The apparatus 10 comprises a display 18 in communication with the computer on which the exponents are reported.

In the operation of the invention, the following is a description of the solution of (1).

II. THE CASE WHEN $\varepsilon_0$−1. A RESTATEMENT

1) Step One. Definition of "Superprimitives"

In general in (1) $a_0$ is not a primitive root of X modulo p−1. It is convenient to restate (1) in such a way that on the LHS of (1) $a_0$ be replaced by a primitive of X modulo p−1.

If $\rho$ denotes a primitive of X modulo p−1, consider the process of raising both sides of (1) by $\rho_j$. As l increases, $a_0^{\rho^j}$ modulo p traces an orbit of primitives modulo p.

If p is large, and if p=2·p'+1, where p' is also prime, approximately half of the elements of G are elements of this orbit [2, p. 269].

For some integer $\bar{l}$, $a_0^{\rho^j}$ is also a primitive of X modulo p−1. In this case, define $$\begin{cases} a_0^{\rho^j} \equiv a \pmod{p} \\ y_0^{\rho^j} \equiv y \pmod{p} \end{cases} \quad (5)$$

Then $$a^x \equiv y \pmod{p}. \quad (6)$$

An integer which is a primitive root of p and also a primitive of X modulo p−1 will be referred to as a superprimitive of p.

Table I shows the superprimitives of a set of small primes ($\varepsilon_0 \leq 2$).

Table II shows some relevant variables for such primes.

TABLE I

| p | Superprimitives of p |
|---|---|
| 11 | 7 |
| 23 | 7, 17, 19 |
| 47 | 5, 11, 15, 19, 33, 43 |
| 59 | 11, 31, 37, 39, 43, 47, 55 |
| 107 | 5, 21, 31, 45, 51, 55, 65, 67, 71, 73, 103 |
| 167 | 5, 13, 15, 35, 39, 43, 45, 53, 55, 67, 71, 73, 79, 91, 101, 103, 105, 117, 125, 129, 135, 139, 143, 145, 149, 155, 159, 163 |
| 263 | 29, 57, 67, 85, 87, 97, 115, 119, 127, 130, 139, 141, 161, 171, 185, 197, 213, 219, 227, 229, 237, 241, 247, 251, 255, 257, 259 |
| 347 | 5, 7, 17, 19, 45, 63, 65, 69, 79, 91, 97, 101, 103, 111, 123, 125, 141, 145, 153, 155, 165, 171, 175, 191, 193, 203, 215, 217, 221, 223, 231, 239, 245, 247, 283, 301, 307, 335, 343, |
| 359 | 7, 21, 35, 53, 63, 71, 97, 103, 105, 109, 113, 119, 137, 143, 157, 159, 163, 167, 175, 189, 197, 209, 211, 213, 223, 251, 257, 263, 265, 269, 271, 277, 291, 293, 299, 309, 311, 313, 315, 319, 327, 329, 339, 341, 343, 349, 353, 355 |
| 383 | 33, 35, 47, 53, 61, 83, 89, 91, 95, 99, 105, 111, 123, 127, 131, 141, 145, 151, 157, 167, 179, 181, 183, 187, 233, 247, 249, 253, 267, 285, 297, 307, 315, 337, 355, 359, 365, 367, 369, 379 |
| 479 | 13, 19, 37, 39, 41, 43, 47, 53, 57, 59, 65, 79, 95, 117, 119, 123, 129, 143, 149, 159, 171, 177, 179, 185, 191, 205, 209, 223, 227, 235, 237, 265, 281, 285, 295, 317, 325, 333, 351, 353, 357, 369, 379, 387, 391, 395, 423, 429, 433, 447, 449, 451, 461, 463, 467, 469, 473, 475 |
| 503 | 19, 29, 37, 53, 55, 57, 71, 87, 107, 109, 111, 127, 133, 137, 139, 159, 163, 165, 167, 191, 193, 203, 213, 215, 239, 269, 277, 295, 305, 307, 313, 321, 327, 333, 341, 347, 349, 371, 381, 385, 399, 409, 417, 419, 437, 453, 457, 461, 467, 471, 475, 479, 481, 485, 487, 489, 495, 499 |
| 587 | 5, 11, 13, 19, 23, 41, 45, 85, 99, 103, 105, 111, 117, 125, 127, 131, 139, 157, 171, 173, 183, 187, 207, 213, 215, 221, 227, 231, 241, 245, 251, 259, 265, 263, 273, 275, 291, 295, 321, 323, 325, 327, 335, 337, 341, 365, 367, 369, 373, 391, 399, 403, 405, 415, 427, 435, 467, 473, 475, 483, 487, 497, 523, 539, 541, 557, 559, 583 |

TABLE II

| p | \|A\| = \|X\| | \|Y\| | \|A ∩ Y\| | \|A\|/(A ∩ Y) |
|---|---|---|---|---|
| 11 | 4 | 2 | 1 | 4.0000 |
| 23 | 10 | 4 | 3 | 3.3333 |
| 47 | 22 | 10 | 6 | 3.6666 |
| 59 | 28 | 12 | 7 | 4.0000 |
| 107 | 52 | 24 | 11 | 4.7273 |
| 167 | 82 | 40 | 28 | 2.9286 |
| 263 | 130 | 48 | 26 | 5.0000 |
| 347 | 172 | 84 | 39 | 4.4103 |
| 359 | 178 | 88 | 48 | 3.7083 |
| 383 | 190 | 72 | 40 | 4.7500 |
| 479 | 238 | 96 | 58 | 4.1034 |
| 503 | 250 | 100 | 58 | 4.3103 |
| 587 | 292 | 144 | 68 | 4.2941 |

NOTE 1: If $\varepsilon_0 \leq 2$, X is cyclic and there exist an integer $\rho$ which is a primitive root of X modulo p−1. If p is large, to determine $\rho$ it is sufficient to select any random integer and to verify that a) $\rho$ is an element of X, which means that it is relatively prime to p−1, and b) $\rho$ is an element of Y, which means that it is relatively prime to $\varphi(p-1)=p'-1$. The process of producing $\rho$ should not be long, because, if p is large, the probability that two integers be prime to one another is $6/\pi^2$ [2, p. 269]. Thus, the probability that an integer chosen at random be prime to p−1 and p'−1 is approximately $(6/\pi^2)^2$ or 1/2.7055.

NOTE 2: The ratio $|A|/|(A \cap Y)|$ is relevant because it is related to the number of trials which should be expected when is employed in the search for a.
NOTE 3: The ratio $|A|/|(A \cap Y)|$ may grow when p increases. As an example, when $p=6466463=2 \cdot p'+1$ and $p'=2 \cdot 5 \cdot 7 \cdot 11 \cdot 13 \cdot 17 \cdot 19+1$, $|A|/|A \cap Y|=7.7931$.
NOTE 4: Comparing the data for $p_2=6466463$ and $p_1=587$, observe that, when p is replaced by $p_2$, the ratio $|A|/|A \cap Y|$ is multiplied by a factor of $7.7931/4.2941$, which is less than 2, while 6466463 is greater than $587^2$.

2) Step Two

In general in (6) y is not a primitive root modulo p. It is convenient to restate (6) in such a way that the RHS of (6) be a primitive modulo p. This can be accomplished by multiplying both sides of (6) by a, a sufficient number of times until the desired condition is satisfied. If after $\tilde{r}$-iterations this condition is satisfied, let $$\begin{cases} b \equiv a^{\tilde{r}} \cdot y \pmod{p} \\ s \equiv x + \tilde{r} \pmod{(p-1)} \end{cases} \quad (7)$$

Then $$a^s \equiv b \pmod{p}. \quad (8)$$

After this restatement the search for x is conducted in a smaller, more structured environment. Since b is a primitive modulo p and a is a primitive of X modulo p−1, s is relative prime to p−1 and can be represented as follows $$\begin{cases} s \equiv a^t \pmod{(p-1)} \\ a^{a^t} \equiv b \pmod{p} \end{cases}, \quad (9)$$

where t denotes an integer and $0 \leq t < \varphi(p-1)$.

3) Step Three

Consider the process of raising the second of (9) to $a^u$ modulo p. Let d denote the least positive residue modulo p of the corresponding RHS of (9). As u increases, the integer d describes an orbit of primitives modulo p. It is desired that d be also a primitive of X modulo p−1. If, after L operations this condition is satisfied, define $$a^{a^{\upsilon}} \equiv d \pmod{p} \quad (10)$$

where $$\begin{cases} \upsilon \equiv t + \tilde{u} \pmod{\varphi(p-1)} \\ d \equiv b^{a^u} \pmod{p} \end{cases} \quad (11)$$

Consider the integer $d^{a^w}$, where w denotes an integer. Since d is a primitive modulo p and a primitive of X modulo p−1, when w varies $d^{a^w}$ traces an orbit which contains all the primitives modulo p, including a.

Therefore, there does exist an integer w such that $$a \equiv d^{a^w} \pmod{p}. \quad (12)$$

4) Conclusion

The exponential congruence (1) is referred to as a "one-way" transaction, meaning that, when x is known, it is easy to compute $a_0^x$ modulo p, while, when $y_0$ is known, the computation of x may be untractable. The restatement introduced by this section produces the congruences (10) and (12), which have similar structure and comparable complexity.

In order to determine the relationship between $\upsilon$ and w, raise (12) to $a^\upsilon$ modulo p. It will be $$a^{a^\upsilon} \equiv d^{a^\upsilon \cdot a^w} \pmod{p}. \quad (13)$$

whence, by (10), $$a^\upsilon \cdot d^w \equiv 1 \pmod{p-1} \quad (14)$$

or $$a^\upsilon \equiv d^{-w} \pmod{p-1}. \quad (14)$$

As a conclusion: $\upsilon$ and w are exponents of known superprimitives of p, a and d, respectively. The integers $a^\upsilon$ and $d^w$ are related in a congruence which is defined modulo p−1.
NOTE 1: In general, given (1), the integers a and d which result from the proposed restatements are not unique.
NOTE 2: In principle, it would be possible to explore the case when a is a superprimitive of p and p−1. As an example, 19 is a superprimitive of 47 and 23. However, not all primes have superprimitives modulo p and modulo p−1.

III. ORTHOGONAL PRIMITIVES WHEN $\varepsilon_0=1$

Refer to (15). Let V denote the set of integers $\upsilon$ and w ($1 \leq \upsilon, w \leq p'-1$) which are candidate solutions of (10), (12), and (15) and let $|V|$ denote their number.
A) It is desired to represent V as the direct product of distinct subsets of T; each one associated with one of the factors ($q_i^{\varepsilon_1}$ or $2^{\varepsilon_0}$) of p'−1.
B) It is desired to partition and process independently the corresponding sets of candidate solutions.
To reach these aims:
A) The number of significant candidate elements associated with each of such sets is $\varphi(q_i^{\varepsilon_i})$. Then the total number of candidate elements, say $|V|$, would be $$|V| = \varphi(p'-1) \quad (16)$$

$$= 2^{\varepsilon_0 - 1} \cdot \prod_{i=1}^{h} \varphi(q_i^{\varepsilon_i}).$$

The candidate elements associated to $\varphi(q_i^{\varepsilon_i})$, say $\rho_i^{\upsilon_i}$, are relatively prime to $q_i$ and can be represented as the elements of a cyclic group having $\rho_i$ as its generator. Notice that, thus far, nothing has been stated concerning the divisibility of $\rho_i$ by $q_j$ when $i \neq j$. B) Consider the case when $\upsilon$ and w are represented as the direct product of their component subgroups. In the case when $\varepsilon_0=1$, $\varepsilon_0-1=0$. In order to process independently the cyclic subsets of V, consider the case when the primitive of the cycle i is defined as follows:

$$\rho_i = 1 + \lambda_i \cdot \varphi(p-1)/q_i^{\varepsilon_i} \qquad (17)$$
$$= \sigma_i + \mu_i \cdot q_i^{\varepsilon_i},$$

where $\sigma_i$ denotes any primitive modulo $q_i$ and $(\lambda_i, \mu_i)$ denotes a pair of integers. Given $\sigma_i$, the pair $(\lambda_i, \mu_i)$ can be any one of the solution pairs of the following:

$$\sigma_i - 1 + \mu_i \cdot q_i^{\varepsilon_i} = \lambda_i \cdot \varphi(p-1)/q_i^{\varepsilon_i}. \qquad (18)$$

Given any solution pair $(\tilde{\lambda}_i, \tilde{\mu}_i)$, its substitution into (17) produces $\rho_i$ modulo $\varphi(p-1)$.

After this restatement, $\rho_i$ is relatively prime to $\varphi(p-1)$.

Consider the case when $p'-1$ has a structure of the form (2) or (3), that is
a) 5 is the smallest odd prime divisor of $p'-1$, and
b) each divisor $q_i$ is the smallest odd prime greater than $q_{i-1}$.

Under these conditions, all the odd prime divisors of $\varphi(p'-1)$, with the exception of 3, are also divisors of $\varphi(p-1)$. It is possible to select $\sigma_i$ in such a way that $\rho_i$ is not a multiple of 3. In this case, $p_i^{v_i}$ is relatively prime with $\varphi(p-1)$ and $\varphi(p'-1)$.

Thus, when $p'-1$ has the structure of (8) and (10) and $\upsilon$ is relatively prime with $\varphi(p-1)$ and 3, it is possible to represent $\upsilon$ and w as follows $$\begin{cases} \upsilon \equiv \prod_{i=1}^{h} \rho_i^{v_i} (\text{mod } \varphi(p-1)) \\ \dot{w} \equiv \prod_{i=1}^{h} \rho_i^{w_i} (\text{mod } \varphi(p-1)) \end{cases} \qquad (19)$$

where $\upsilon_i$ and $w_i$ denote integers defined modulo $\varphi(e)$.
It will be $$\begin{cases} \frac{\varphi(p-1)}{q_i^{\varepsilon_i}} \cdot \rho_j \equiv \frac{\varphi(p-1)}{q_i^{\varepsilon_i}} (\text{mod } \varphi(p-1)) & \text{for } i \neq j \\ \frac{\varphi(p-1)}{q_i^{\varepsilon_i}} \cdot \rho_j \equiv \frac{\varphi(p-1)}{q_i^{\varepsilon_i}} \cdot \sigma_j (\text{mod } \varphi(p-1)) & \text{for } i = j \end{cases} \qquad (20)$$

The congruences (20) define the orthogonality between $\rho_i$ and $\rho_j$, for $i \neq j$, and validate the definition of $\rho_i$ offered by (17).

Notice that the definitions (17) imply that $$\rho_i^{\varphi(q_i^{\varepsilon_i})} \equiv 1 (\text{mod} \varphi(p-1)).$$

In fact, $$\rho_i^{\varphi(q_i^{\varepsilon_i})} = (\sigma_i + \mu_i \cdot q_i^{\varepsilon_i})^{\varphi(q_i^{\varepsilon_i})} \qquad (22)$$
$$\equiv 1 + \chi_i \cdot q_i^{\varepsilon_i} (\text{mod } q_i^{\varepsilon_i})$$

and also, for all positive integers n, $$\rho_i^n = (1 + \lambda_i \cdot \varphi(p-1)/q_i^{\varepsilon_i})^n \qquad (23)$$
$$= 1 + \psi_i \cdot \varphi(p-1)/q_i^{\varepsilon_i}$$

for some $\chi_i$ and $\psi_i$ integers. Combining (22) and (23), (21) follows. Refer to Section I of the Appendix.

IV. THE RELATIONSHIP BETWEEN $\upsilon_i$ AND $w_i$ MODULO $\varphi(q_i^{\varepsilon_i})$ WHEN $\varepsilon_0=1$ Using orthogonal primitives (17), consider raising (15) to $$\frac{\varphi(p-1)}{q_i^{\varepsilon_i}}$$

modulo $p-1$.
It will be $$\left(a^{\frac{\varphi(p-1)}{q_i^{\varepsilon_i}}}\right)^{\sigma_i^{v_i}} \equiv \left(d^{\frac{\varphi(p-1)}{q_i^{\varepsilon_i}}}\right)^{-\sigma_i^{w_i}} (\text{mod}(p-1)). \qquad (24)$$

Let $$\begin{cases} \alpha_i \equiv a^{\frac{\varphi(p-1)}{q_i^{\varepsilon_i}}} (\text{mod } (p-1)) \\ \delta_i \equiv d^{\frac{\varphi(p-1)}{q_i^{\varepsilon_i}}} (\text{mod } (p-1)) \end{cases} \qquad (25)$$

Then $$\alpha_i^{\sigma_i^{v_i}} \equiv \delta_i^{-\sigma_i^{w_i}} (\text{mod}(p-1)). \qquad (26)$$

This congruence establishes a relationship between $\upsilon_i$ and $w_i$ which does not depend on any of the values of $\upsilon_j$ and $w_j$, for $i \neq j$. However, this relationship does not identify the value of v which is consistent with (6).

NOTE 1: a and d are primitives modulo $p-1$. Therefore, they are relatively prime with $\varphi(p-1)$. When a or d are raised to a divisor of $\varphi(p-1)$, such as $\varphi(p-1)/q_i^{\varepsilon_i}$, they produce primitives modulo $\varphi(p-1)$ for the sets $$\{\sigma_i^{v_i}\} \text{ and } \{\sigma_i^{w_i}\},$$

respectively.

V. INVERTIBLE SUPERPRIMITIVE

1) Definition

A superprimitive of p defined as invertible if its inverse modulo p is also a superprimitive of p. In general, only some of the superprimitives are invertible. Table III shows the invertible superprimitives of the set of primes which are included in Tables I and II.

TABLE III

| p | Superprimitives of p | Invertible Superprimitives | Number of Superprimitives | Number of Invertible Superprimitives | Ratio |
|---|---|---|---|---|---|
| 11 | 7 | | 1 | 0 | 0 |
| 23 | 7, 17, 19 | 17, 19 | 3 | 2 | 0.666667 |
| 47 | 5, 11, 15, 19, 33, 43 | 5, 19 | 6 | 2 | 0.333333 |
| 59 | 11, 31, 37, 39, 43, 47, 55 | 11, 43 | 7 | 2 | 0.285714 |
| 107 | 5, 21, 31, 45, 51, 55, 65, 67, 71, 73, 103 | 21, 51 | 11 | 2 | 0.181818 |
| 167 | 5, 13, 15, 35, 39, 43, 45, 53, 55, 67, 71, 73, 79, 91, 101, 103, 105, 117, 125, 129, 135, 139, 143, 145, 149, 155, 159, 163 | 5, 35, 43, 67, 101, 105, 125, 129, 145, 163 | 28 | 10 | 0.357143 |
| 263 | 29, 57, 67, 85, 87, 97, 115, 119, 127, 130, 139, 141, 161, 171, 185, 197, 213, 219, 227, 229, 237, 241, 247, 251, 255, 257, 259 | 29, 97, 115, 127, 141, 197, 219, 241, 247, 251, 257, 259 | 26 | 12 | 0.461538 |
| 347 | 5, 7, 17, 19, 45, 63, 65, 69, 79, 91, 97, 101, 103, 111, 123, 125, 141, 145, 153, 155, 165, 171, 175, 191, 193, 203, 215, 217, 221, 223, 231, 239, 245, 247, 283, 301, 307, 335, 343, | 17, 69, 79, 103, 123, 171, 245, 283 | 39 | 8 | 0.205128 |
| 359 | 7, 21, 35, 53, 63, 71, 97, 103, 105, 109, 113, 119, 137, 143, 157, 159, 163, 167, 175, 189, 197, 209, 211, 213, 223, 251, 257, 263, 265, 269, 271, 277, 291, 293, 299, 309, 311, 313, 315, 319, 327, 329, 339, 341, 343, 149, 353, 355 | 157, 197, 209, 213, 223, 257, 269, 271, 277, 293, 299, 339, 341, 343, 353, 355 | 48 | 16 | 0.333333 |
| 383 | 33, 35, 47, 53, 61, 83, 89, 91, 95, 99, 105, 111, 123, 127, 131, 141, 145, 151, 157, 167, 179, 181, 183, 187, 233, 247, 249, 253, 267, 285, 297, 307, 315, 337, 355, 359, 365, 367, 369, 379 | 359, 367 | 40 | 2 | 0.05 |
| 479 | 13, 19, 37, 39, 41, 43, 47, 53, 57, 59, 65, 79, 95, 117, 119, 123, 129, 143, 149, 159, 171, 177, 179, 185, 191, 205, 209, 223, 227, 235, 237, 265, 281, 285, 295, 317, 325, 333, 351, 353, 357, 369, 379, 387, 391, 395, 423, 429, 433, 447, 449, 451, 461, 463, 467, 469, 473, 475 | 19, 47, 53, 177, 235, 265, 325, 353, 433, 449, 451, 463 | 58 | 12 | 0.206897 |
| 503 | 19, 29, 37, 53, 55, 57, 71, 87, 107, 109, 111, 127, 133, 137, 139, 159, 163, 165, 167, 191, 193, 203, 213, 215, 239, 269, 277, 295, 305, 307, 313, 321, 327, 333, 341, 347, 349, 371, 381, 385, 399, 409, 417, 419, 437, 453, 457, 461, 467, 471, 475, 479, 481, 485, 487, 489, 495, 499 | 19, 53, 133, 193, 213, 295, 305, 307, 409, 417, 467, 475, 485, 489 | 58 | 14 | 0.241379 |
| 587 | 5, 11, 13, 19, 23, 41, 45, 85, 99, 103, 105, 111, 117, 125, 127, 131, 139, 157, 171, 173, 183, 187, 207, 213, 215, 221, 227, 231, 241, 245, 251, 259, 265, 263, 273, 275, 291, 295, 321, 323, 325, 327, 335, 337, 341, 365, 367, 369, 373, 391, 399, 403, 405, 415, 427, 435, 467, 473, 475, 483, 487, 497, 523, 539, 541, 557, 559, 583 | 11, 85, 111, 117, 215, 221, 241, 275, 291, 321, 341, 415, 427, 435, 475, 523 | 69 | 16 | 0.231884 |

Consider the case when a denotes an invertible superprimitive, and let g denote its inverse modulo p. Then, for some integers $\upsilon$ and w, the conditions (10) and (12) take the following forms:

$$a^{a^{\upsilon}} \equiv a^{-1} \pmod{p} \qquad (27)$$

and $$g^{-1} \equiv g^{g^{w}} \pmod{p}. \qquad (28)$$

Therefore, $$a^{a^{\upsilon}+1} \equiv 1 \pmod{p} \qquad (29)$$

whence $$a^{\upsilon} \equiv -1 \pmod{p-1} \qquad (30)$$

or $$a^{2\cdot\upsilon} \equiv 1 \pmod{p-1}). \qquad (31)$$

Similarly, $$g^{2\cdot w} \equiv 1 \pmod{p-1}). \qquad (32)$$

Then $$2\cdot\upsilon \equiv 0 \pmod{\varphi(p-1)} \qquad (33)$$

and $$2\cdot w \equiv 0 \pmod{\varphi(p-1)}. \qquad (34)$$

Thus, $$\upsilon \equiv w\left(\mathrm{mod}\,\frac{\varphi(p-1)}{2}\right). \qquad (35)$$

VI. THE DETERMINATION OF $\upsilon$ AND w WHEN $\varepsilon_0=1$

1) The Selection of a and d

Section II.1 describes how to select a superprimitive a. The algorithm proposed herein will require that a be an invertible superprimitive of p. This can be accomplished by raising $a_0$ to an increasing integer $p^j > p^i$, until the desired condition is satisfied. (Step One).

After the definition of a, it will be necessary to transform (6) in such a way that the RHS be an invertible superprimitive of p, namely d. (Step Two and Three).

Thus, the proposed algorithm will operate on two invertible superprimitives of p, namely
1) a (invertible superprimitive)
2) d (invertible superprimitive)

2) The Problem

Given the pair (a, d), to determine $\upsilon$ there are two conditions which must be satisfied.
A) The first condition is equation (14), which is defined modulo p−1.
B) A second condition on the pair ($\upsilon$, w) is placed by the congruences (10) and (12), which are defined modulo p.

Consider the problem of solving the system of (10) and (12)

$$\begin{cases} a^{a^\upsilon} \equiv d(\mathrm{mod}\,p) \\ a \equiv d^{d^w}(\mathrm{mod}\,p) \end{cases} \qquad (36)$$

under the condition (14).
Define $$\begin{cases} a^U \cdot d \equiv 1(\mathrm{mod}\,p-1) \\ a \cdot d^W \equiv 1(\mathrm{mod}\,p-1) \end{cases}. \qquad (37)$$

Refer to Appendix II.
Substitute the second of (37) into (14). It will be $$d^{-W \cdot \upsilon} \cdot d^w \equiv 1(\mathrm{mod}\,p-1), \qquad (38)$$

or $w = W \cdot \upsilon$ modulo $\varphi(p-1)$.

Then the second of (37) becomes $$a \equiv d^{d^{W \cdot \upsilon}}(\mathrm{mod}\,p) \qquad (40)$$
$$= d^{-a \cdot \upsilon}(\mathrm{mod}\,p).$$

Thus, the system (36) becomes $$\begin{cases} a^{a^\upsilon} \equiv d(\mathrm{mod}\,p) \\ a \equiv d^{a^{-\upsilon}}(\mathrm{mod}\,p) \end{cases}. \qquad (41)$$

The original problem requires finding the solution of the first of (41).

3) The Solution 1) a and d are two physical numbers and are independent on any modular transactions of which they may become a part. Specifically, if we say d=317, we mean that d denotes the number 317, not 317 modulo anything.
2) If $\upsilon$ were known, the transition from a to d could be executed by raising a to $a^\upsilon$ modulo p.
3) Also, the transition from a to d can be executed by computing the discrete logarithm of d module p−1 in base a. To this end, define $$a^{U(a,d)} \equiv d(\mathrm{mod}\,p-1). \qquad (42)$$

Refer to Section II of the Appendix.
4) The two bridges from a to d are defined modulo p−1 and produce the same transition.
They can be compared operating modulo p−1.
5) A different approach consists of considering the following integers:

$$\begin{cases} A_i = a^{\frac{\varphi(p-1)}{q_i^{\varepsilon_i}}} \\ D_i = d^{\frac{\varphi(p-1)}{q_i^{\varepsilon_i}}} \end{cases}. \qquad (43)$$

These integers can be very large. In principle, their definition is independent of any modular transaction of which they may become a part. It is possible to substitute the pair ($A_i$, $D_i$) into (41). It will be $$A_i^{\alpha_i^{\sigma_i^{\upsilon_i}}} \equiv D_i(\mathrm{mod}\,p). \qquad (44)$$

The solution $\tilde{\upsilon}_i$ of this congruence is unique.
NOTE 1: After the solution $\tilde{\upsilon}_1$ of (44) has been produced, the process must be repeated for all $j \neq i$. Then $\upsilon$ can be computed using (19). The integer x follows, using (11) (9), (8) and (7).

VII. THE CASE WHEN $\varepsilon_0=2$

Refer to (16) and (19). If $\varepsilon_0=2$, the set of generators $\{p_i | 1 \leq i \leq h\}$ must be expanded to include the generator $\rho_{0,0}$ of a subgroup of V consisting of two elements. In this case (19) must be replaced by the following $$\begin{cases} \upsilon \equiv \rho_{0,0} \cdot \prod_{i=1}^{h} \rho_i^{\upsilon_i}(\mathrm{mod}\,\varphi(p-1)) \\ w \equiv \rho_{0,0} \cdot \prod_{i=1}^{h} \rho_i^{w_i}(\mathrm{mod}\,\varphi(p-1)) \end{cases}. \qquad (45)$$

Let $\sigma_{0,0}$ denote the primitive of a cycle of two elements modulo $2^{\varepsilon_0}$. It will be $$\sigma_{0,0} \equiv 3 (\mod 2^2). \tag{46}$$

Then, by (17), $$\rho_{0,0} = 1 + \lambda_{0,0} \cdot \frac{\varphi(p-1)}{4} \tag{47}$$
$$= -1 + \mu_{0,0} \cdot 4.$$

Let $$\mu_{0,0} \cdot 4 = 2 + \lambda_{0,0} \cdot \frac{\varphi(p-1)}{4}. \tag{48}$$

Given a solution pair $(\tilde{\lambda}_{0,0}, \tilde{\mu}_{0,0})$ of (48), after substitution into (47), $\rho_{0,0}$ modulo $\varphi(p-1)$ follows.
It will be:

$$\begin{cases} gcd(\rho_{0,0}, p-1) = 1 \\ gcd(\rho_{0,0}, \varphi(p-1)) = 1 \end{cases}. \tag{49}$$

To determine the pair $(\upsilon_{0,0}, w_{0,0})$, define $$\begin{cases} \alpha_{0,0} \equiv a^{\frac{\varphi(p-1)}{4}} (\mod p-1) \\ A_{0,0} \equiv a^{\frac{\varphi(p-1)}{4}} (\mod p) \end{cases} \tag{50}$$

and $$D_{0,0} \equiv d^{\frac{\varphi(p-1)}{4}} (\mod p). \tag{51}$$

Then $\upsilon_{0,0}$ is a solution of the following:

$$A_{0,0}^{\alpha_{0,0}^{\upsilon_{0,0}}} \equiv D_{0,0} (\mod p), \tag{52}$$

where $\upsilon_{0,0}$ is either 0 or 1.

VIII. THE CASE WHEN $\varepsilon_0 > 2$

1) The Problem

If $\varepsilon_0 > 2$, X is not a cyclic group and there does not exist an integer $\sigma_{0,0}$ which generates a subgroup of V containing $2^{\varepsilon_0-1}$ elements modulo $2^{\varepsilon_0}$ [1, p. 206]. However, there exist integers $\sigma_0$ such that $$\begin{cases} \sigma_0^{2^{\varepsilon_0-3}} \not\equiv 1 (\mod 2^{\varepsilon_0}) \\ \sigma_0^{2^{\varepsilon_0-2}} \equiv 1 (\mod 2^{\varepsilon_0}) \end{cases}. \tag{53}$$

As an example, if $\varepsilon_0=5$, for any integer of the form $\varepsilon_0 = 4 \cdot ODD + 1$ it is $$\begin{cases} \sigma_0^4 \not\equiv 1 (\mod 2^5) \\ \sigma_0^8 \equiv 1 (\mod 2^5) \end{cases}. \tag{54}$$

Refer to Section III of the Appendix.

As a result, if $\varepsilon_0 > 2$, in order to produce $2^{\varepsilon_0-1}$ elements modulo $2^{\varepsilon_0}$, it is necessary to employ the direct product of two subgroups of V, one containing $2^{\varepsilon_0-2}$ elements and one containing 2 elements. Let $\sigma_{0,0}$ and $\sigma_0$ denote the generators of the two subgroups having 2 and $2^{\varepsilon_0-2}$ elements, respectively. Of course, $\varepsilon_{0,0}$ should be an integer which cannot be produced by computing $\sigma_0^{\upsilon_0} (\mod 2^{\varepsilon_0-2})$, for any integer $\upsilon_0$. This can be accomplished by defining $$\begin{cases} \sigma_0 = 4 \cdot ODD + 1 \\ \sigma_{0,0} = -1 + 2^{\varepsilon_0-1} \end{cases}. \tag{55}$$

With this selection of $\sigma_0$ and $\sigma_{0,0}$ the product $\sigma_{0,0}^{\upsilon_{0,0}} \cdot \sigma_0^{\upsilon_0} (\mod 2^{\varepsilon_0})$ generates all the odd integers from 1 to $2^{\varepsilon_0}-1$.
The integer $\rho_0$ can be determined by letting $$\rho_0 = 1 + \lambda_0 \cdot \frac{\varphi(p-1)}{2^{\varepsilon_0}} \tag{56}$$
$$= \sigma_0 + \mu_0 \cdot 2^{\varepsilon_0-2}.$$

Since gcd $$\left(2^{\varepsilon_0-2}, \frac{\varphi(p-1)}{2^{\varepsilon_0}}\right) = 1,$$

the integers $\lambda_0$ and $\mu_0$ exist, and so does $\rho_0$.
Likewise, $\rho_{0,0}$ can be defined by letting $$\rho_{0,0} = 1 + \lambda_{0,0} \cdot \frac{\varphi(p-1)}{2^{\varepsilon_0}} \tag{57}$$
$$= -1 + \mu_{0,0} \cdot 2^{\varepsilon_0-2}.$$

Then the general expression (17) of the integers $\upsilon$ and $w$ must be restated as follows:

$$\begin{cases} \upsilon \equiv \rho_{0,0}^{\upsilon_{0,0}} \cdot \rho_0^{\upsilon_0} \cdot \prod_{i=1}^{h} \rho_i^{\upsilon_i} (\mod \varphi(p-1)) \\ w \equiv \rho_{0,0}^{w_{0,0}} \cdot \rho_0^{w_0} \cdot \prod_{i=1}^{h} \rho_i^{w_i} (\mod \varphi(p-1)) \end{cases}. \tag{58}$$

For $1 \leq i \leq h$ it is still possible to produce primitives $\rho_i$ which are orthogonal to each other and to $\rho_0$. However, it is not possible to identify two values of $\rho_{0,0}$ and $\rho_0$ which are orthogonal to each other. In other words, there does not exist a primitive of X modulo $\rho-1$ which enables the restatement described in Section II. Therefore, after the determination of all $p_i$, for $1 \leq i \leq h$, it is necessary to explore all the possibilities produced by $\rho_{0,0}$ and $\rho_0$. Since the order of $\rho_{0,0}$ is 2, two sets of circumstances must be considered.

In general, the elements of X can be grouped into two sets, namely $X_0$ and $X_1$, which correspond to the cases when $\upsilon_{0,0}=0$ and $\upsilon_{0,0}=1$, respectively.

2) The Case when $\upsilon_{0,0}=0$

If $\upsilon_{0,0}=0$, the number of elements in V is $$\begin{cases} \upsilon_{0,0} = 0 \\ |V| = 2^{\varepsilon_0 - 2} \cdot \prod_{i=1}^{h} \varphi(q_i^{\varepsilon_i}) \end{cases} \quad (59)$$

Compare with (16).
In this case $X_0$ is a cyclic group and there exist integers p which are primitive roots of $X_0$ modulo p−1. Let $Y_0$ denote the set of primitive roots of $X_0$ modulo p−1. If $p \in Y_0$, let $A_0$ denote the set of primitive roots of p which are produced by letting $$a_0^{p^j} \equiv a \pmod{p}. \quad (60)$$

For some integers $\tilde{I}$, a will also be an element of $Y_0$. In these cases $$\begin{cases} \varepsilon_0 > 2 \\ |X| = |A| \\ |X| = |X_0 \cup X_1| \\ |X_0| = |X_1| \\ |A| = |A_0 \cup A_1| \\ |A_0| = |A_1| \\ |X_0| = |A_0| \\ \frac{|X_0|}{|A|} = 1/2. \end{cases} \quad (61)$$

Let $\sigma_0$ denote a primitive root of $X_0$ modulo $2^{\varepsilon_0-2}$. Assume that $\sigma_0 = 4 \cdot \text{ODD} + 1$.
In this case, define $$\begin{cases} \alpha_0 \equiv a^{\frac{\varphi(p-1)}{2^{\varepsilon_0-1}}} \pmod{p-1} \\ A_0 \equiv a^{\frac{\varphi(p-1)}{2^{\varepsilon_0-1}}} \pmod{p-1} \end{cases} \quad (62)$$

and $$D_0 \equiv d^{\frac{\varphi(p-1)}{2^{\varepsilon_0-1}}} \pmod{p-1}. \quad (63)$$

Then $$A_0^{\alpha_0^{\sigma_0^{\upsilon_0}}} \equiv D_0 \pmod{p}. \quad (64)$$

3) An Example

As an example, if $\varepsilon_0 = 6$ and $2^{\varepsilon_0} = 64$, let $\sigma_0 = 5$ and $\sigma_{0,0} = 31$. The elements of X are $2^{\varepsilon_0 - 1} = 32$. When $\upsilon_{0,0}=0$, the elements of $X_0$ are $2^{\varepsilon_0 - 2} = 16$. When $\upsilon_{0,0}=1$, the elements of $X_1$ are 16. Thus, when the elements of X are reduced modulo 64, it will be $$X_0 = \{1, 5, 25, 61, 49, 53, 9, 45, 33, 37, 57, 29, 17, 21, 41, 13\} \quad (65)$$

$$X_1 = \{31, 27, 7, 35, 47, 43, 23, 51, 63, 59, 39, 3, 15, 11, 55, 19\}$$

$$= \{31 \cdot \text{each one of the elements of } X_0\}.$$

Since $X_0$ is a cyclic group, let $Y_0$ denote the set of primitive roots of $X_0$ modulo $2^{\varepsilon_0}$. In the example, $$Y_0 = \{5, 61, 53, 45, 37, 29, 21, 13\}. \quad (66)$$

Also, define $Y_1$ as the set of elements produced when all the elements of $Y_0$ are multiplied by $\sigma_{0,0}$. In the example, it will be $$Y_1 = \{27, 35, 43, 51, 59, 3, 11, 19\} \quad (67)$$

$$= \{31 \cdot \text{each one of the elements } Y_0\}.$$

NOTE 1: In the example, 31 and 63 are the only elements of $X_1$ for which $31^2 \equiv 1 \pmod{64}$ and $63^2 \equiv 1 \pmod{64}$.
NOTE 2: In the example, any element of $Y_0$, when raised to 31 modulo 64, produces another elements of $Y_0$. In fact, gcd (31, 32)=1 and gcd (31, 64)=1. Thus, $$\begin{cases} 5^{31} \equiv 13 \pmod{64} \\ 61^{31} \equiv 21 \pmod{64} \\ \ldots \\ 45^{31} \equiv 37 \pmod{64} \end{cases} \quad (68)$$

4) The Algorithm when $\upsilon_{0,0}=0$

The solution $\upsilon_0$ can be determined using the procedure defined by (64).
After the determination of $\upsilon_0$, the algorithm should proceed to the determination of the candidate values of $\upsilon_i$, for $1 \le i \le h$.
If the resulting value of $\upsilon$ is not consistent with (6), the assumption $\upsilon_{0,0}=0$ must be discarded and the case $\upsilon_{0,0}=1$ must be considered.

5) The Case when $\upsilon_{0,0}=1$

Consider first the case when $a \in A_0$. Then $$a^{a^{\upsilon}} \equiv d \pmod{p}$$

and $d \in A_0$.
Define $A_1$ as the set of primitives modulo p which are not elements of $A_0$. One example is $$\bar{a} \equiv a^{\rho_{0,0}}(\bmod p), \tag{69}$$

which implies that $$a \equiv \bar{a}^{\bar{\rho}_{0,0}}(\bmod p). \tag{70}$$

Notice that $\bar{a}$ is a primitive modulo p because gcd ($\rho_{0,\,0}$, p−1)=1.

Given $\bar{a}$, all the elements of $A_1$ can be produced by raising $\bar{a}$ to the elements of $X_0$. Notice that, after the introduction of $\bar{a} \in A_1$, operating in $A_1$ follows the same procedures which were used operating in $A_0$ using $a \in A_0$. Thus the definition of $\bar{a}$ given a can be used to produce all of the elements of $A_i$ by raising $\bar{a}$ to any element of $X_0$. In particular, consider the case when $\bar{a}$ is raised to $\bar{a}$ modulo p. Since a is an element of $X_0$ and $Y_0$, $\bar{a}$ is an element of $Y_0 \cap A_1$.

$$\varepsilon_0 > 2 \tag{71}$$
$$a \in A_0$$
$$a \in X_0$$
$$a \in Y_0$$
$$\bar{a} \in A_1$$
$$\bar{a} \in Y_0$$
$$\bar{a} \in Y_0 \cap A_1$$

Refer to NOTE 2 in Section 4 above.

The same observation can be made about $\bar{d}$. Therefore, for some integers $\upsilon$ and w, it is $$\begin{cases} \bar{a}^{\bar{a}^{\upsilon}} \equiv \bar{d}(\bmod p) \\ \bar{a} \equiv \bar{d}^{\bar{d}^{w}}(\bmod p) \end{cases}, \tag{72}$$

whence $$a^{\rho_{0,0} \cdot \upsilon} \equiv d^{-\rho_{0,0} \cdot w}(\bmod p - 1). \tag{73}$$

Raising a and d to $\varphi(p-1)/2^{\varepsilon_0}$ modulo p−1 produces $$\alpha_0^{\rho_{0,0} \cdot \sigma_0^{\upsilon_0}} \equiv \delta_0^{-\rho_{0,0} \cdot \sigma_0^{w_0}}(\bmod p - 1). \tag{74}$$

Compare with (26).

The procedures which were used to produce $\upsilon_0$ and v, can be repeated.

IX. CONCLUSION

The procedures described in Sections III through VII above were designed to determine v given p and the pair (a, d). The integer $\upsilon$ is related to x through (11), (9), (8) and (7) that is through $\bar{u}$, t, s, and $\bar{r}$.

To determine the execution time of the proposed algorithm, note that each one of such operations as multiplication, exponentiation, calculation of inverses and solution of linear congruences has an execution time not exceeding $\log^2 m$, where m is the modulus of the operation. Also, the number of operations to be executed modulo p or modulo p' is of the order of log log p. Therefore, the total execution time is of an order which does not exceed log log p·$\log^2$ p.

APPENDIX

Notes on Orthogonal Primitives

I. An Example

Let $$a^x \equiv b(\bmod 71), \tag{A.1}$$

where a and b are primitive roots modulo 71.

Then x is an element of the set X, containing all the integers which are relatively prime to p−1=70=2·5·7.

The order of X is $\varphi(70)=\varphi(5)\cdot\varphi(7)=24$. The exponent of X is e(X)=1 cm (4, 6)=12. Then X can be described as the direct product of a cyclic subgroup of order 2 and a cyclic subgroup of order 12 as follows:

$$X = C_1(2) \times C_2(12). \tag{A.2}$$

Also, the elements of X can be represented by using orthogonal primitives. In this case, given a selection of $\sigma_1(\bmod 7)$ and $\sigma_2(\bmod 5)$, $\rho_1(\bmod 70)$ and $\rho_2(\bmod 70)$ can be computed by letting $$\rho_1 = I + \lambda_1 \cdot \frac{p-1}{7} \tag{A.3}$$
$$= \sigma_1 + \mu_1 \cdot 7$$

and $$\rho_2 = 1 + \lambda_2 \cdot \frac{p-1}{5} \tag{A.4}$$
$$= \sigma_2 + \mu_2 \cdot 5.$$

For $\sigma_1 \equiv 5(\bmod 7)$ and $\sigma_2 \equiv 3(\bmod 5)$, it will be $\rho_1 \equiv 61(\bmod 70)$ and $\rho_2 \equiv 43(\bmod 70)$. Then $$x \equiv 61^{x_1} \cdot 43^{x_2}(\bmod 70). \tag{A.5}$$

Figure 2:
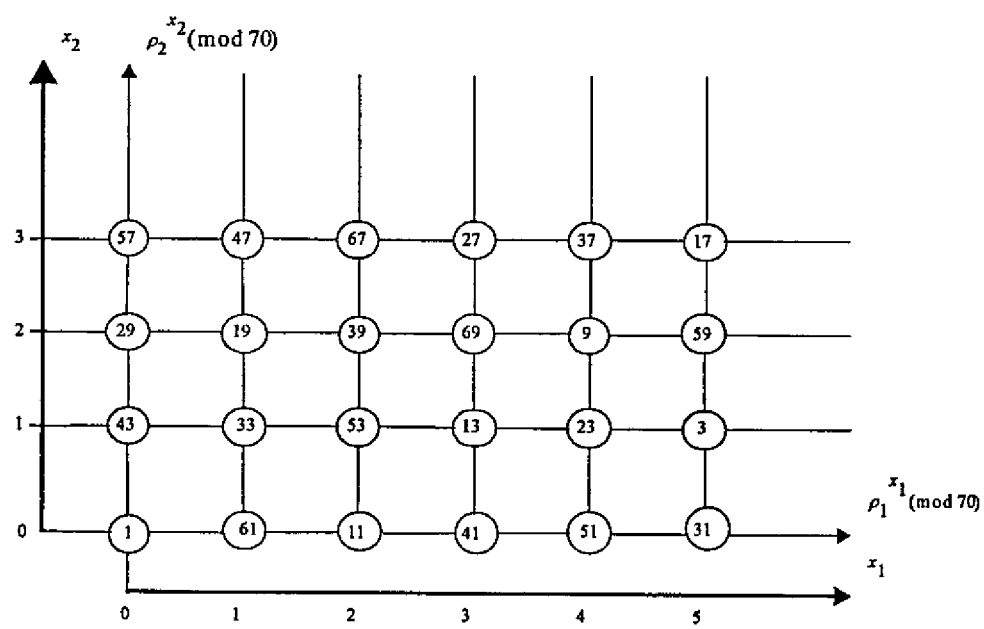
FIG. 2 is a representation of $\rho_1^{x_1} \cdot \rho_2^{x_2} (\mod 70)$ using orthogonal primitives.

FIG. 2 shows the elements of X as intersections of vertical and horizontal straight lines through $61^{x_1}(\bmod 70)$ and $43^{x_2}(\bmod 70)$, respectively.

It is apparent that the elements on a vertical line (constant $x_1$) are congruent to one another modulo 14=2·7. Likewise, the elements on a horizontal line are congruent to one another modulo 2·5=10.

Also, each elements of X is a product of its horizontal and vertical components. Thus, 67≡11·57(mod 70).

Different selections of the primitives $\sigma_1$ and $\sigma_2$ would cause appropriate permutations of the vertical and horizontal lines, respectively.

Observe that, by (A.3) and (A.4), $$\begin{cases} \frac{70}{7} \cdot \rho_1 \equiv \frac{70}{7} \cdot \sigma_1 \cdot (\bmod 70) \\ \frac{70}{7} \cdot \rho_2 \equiv \frac{70}{7} (\bmod 70) \end{cases} \quad (A.6)$$

Therefore, raising (A.1) to 10 (modulo 71) yields $$(a^{10})^{5x_1} \equiv b^{10} (\bmod 71). \quad (A.7)$$

Likewise, raising (A.1) to 14 (modulo 71) yields $$(a^{14})^{3x_2} \equiv b^{14} (\bmod 71). \quad (A.8)$$

Therefore, in the example, $x_2$ and $x_1$ can be determined independently of each other.

II. Discrete Logarithms Modulo p−1

The congruence (14) defines the relationship between $a^\upsilon$ and $d^w$ which is repeated here:

$$a^\upsilon \cdot d^w \equiv 1 (\bmod p-1). \quad (75)$$

It is convenient to develop a simple relationship between the integers a and d which does not refer to the variations of the pair $(\upsilon, w)$. Specifically, when $\upsilon=1$ or $w=1$, such a relationship can be stated as $$\begin{cases} v = 1 \\ a \cdot d^W \equiv 1 (\bmod (p-1)) \end{cases} \quad (76)$$

or $$\begin{cases} w = 1 \\ a^U \cdot d \equiv 1 (\bmod (p-1)) \end{cases}. \quad (77)$$

Notice that $$U \cdot W \equiv 1 (\bmod \omega(p-1)). \quad (78)$$

To develop U and W, it is convenient to represent $\upsilon$ and $w$ using (19) and to partition the problem as in (26), which is repeated here:

$$\alpha_i^{\sigma_i^{v_i}} \equiv \delta_i^{-\sigma_i^{w_i}} (\bmod p-1). \quad (79)$$

Let $w_{i,m}$ denote the value of $w_i$ when $\upsilon_i \equiv 0 (\bmod \varphi(q_i^{\varepsilon_i}))$. Then $$\alpha_i \equiv \delta_i^{-\sigma_i^{w_{i,m}}} (\bmod p-1). \quad (A.9)$$

Likewise, let $\upsilon_{i,m}$ denote the value of $\upsilon_i$ when $w_i \equiv 0 (\bmod \varphi(q_i^{\varepsilon_i}))$. Then $$\alpha_i^{\sigma_i^{v_{i,m}}} \equiv \delta_i^{-1} (\bmod p-1). \quad (A.10)$$

Consider the case when all the $\upsilon_j$'s are congruent to zero modulo $\varphi(q_i^{\varepsilon_i})$. In this case, from (19), $$a \equiv d^{-\prod_{j=1}^{h} \rho_j^{w_{j,m}}} (\bmod p-1). \quad (A.11)$$

Let $$W = \prod_{j=1}^{h} \rho_j^{w_{j,m}}. \quad (A.12)$$

Then $$a \equiv d^{-W} (\bmod p-1). \quad (A.13)$$

Likewise, consider the case when all the $w_j$'s are congruent to zero modulo $\varphi(q_j^{\varepsilon_j})$. In this case $$a^{\prod_{j=1}^{h} \rho_j^{v_{j,m}}} \equiv d^{-1} (\bmod p-1). \quad (A.14)$$

Let $$U = \prod_{j=1}^{h} \rho_j^{v_{j,m}}. \quad (A.15)$$

Then $$a^U \equiv d^{-1} (\bmod p-1). \quad (A.16)$$

III. THE ORDER OF $\varepsilon_0 = 4 \cdot \text{ODD} + 1$ MODULO $2^{\varepsilon_0}$ When $\sigma_0 = 4 \cdot \text{ODD} + 1$, the order of $\sigma_0$ modulo $2^{\varepsilon_0}$ equals $2^{\varepsilon_0-2}$:

$$\sigma_0^{2^{\varepsilon_0-2}} \equiv 1 (\bmod 2^{\varepsilon_0}). \quad (A.17)$$

Consider the case when $\sigma_0 = 4 \cdot \text{ODD} + 1$. Then $$\begin{cases} \sigma_0 \equiv 4 \cdot (2 \cdot k + 1) + 1 (\bmod 2^{\varepsilon_0}) \\ \quad \equiv 1 + 2^2 + 8 \cdot k (\bmod 2^{\varepsilon_0}) \\ \sigma_0^2 \equiv 1 + 2^3 + 16 \cdot k_1 (\bmod 2^{\varepsilon_0}) \\ \sigma_0^4 \equiv 1 + 2^4 + 32 \cdot k_2 (\bmod 2^{\varepsilon_0}) \\ \quad \ldots \\ \sigma_0^{2^{\varepsilon_0-3}} \equiv 1 + 2^{\varepsilon_0-1} (\bmod 2^{\varepsilon_0}) \\ \sigma_0^{2^{\varepsilon_0-2}} \equiv 1 (\bmod 2^{\varepsilon_0}) \end{cases} \quad (A.18)$$

($k, k_1, k_2$ integers).

Notice that the integer $\sigma_{0,0} = -1+2^{\varepsilon_0-1}$ cannot be produced as a power of $\sigma_0$.

III. ATTACHMENT

There exist several variations of encryption systems based on the difficulty of computing discrete logarithms modulo a prime. In the core system the participants share the knowledge of a prime p and one of its primitives, usually denoted as a. All the participants publish their own address $c_P$, which they compute as $c_P = a^{m_P}$, where $m_P$ is a random integer which is known to the addressee only.

Any participant who wishes to communicate confidentially with any other participant, say with participant B, transmits to the addressee B a pair of integers denoted as (R, S), where $$\begin{cases} R = a^r \\ S = \text{message} \cdot c_B^r \end{cases},$$

where r is a random number selected by the sender. The receiver retrieves the message by computing $$\frac{S}{R^{m_B}} = \text{message} \cdot \frac{a^{r \cdot m_B}}{a^{r \cdot m_B}}.$$
$$= \text{message}$$

The only other persons who can retrieve the message are the persons who know $m_B$ or can compute $m_B$ as the discrete logarithm of $c_B$ in base a.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

REFERENCES, ALL OF WHICH ARE INCORPORATED BY REFERENCE HEREIN

[1] T. M. Apostol, *Introduction to Analytic Number Theory*, New York, N.Y.: Springer-Verlag, 1976. [2] G H. Hardy, E. M. Wright, *An Introduction to the Theory of Numbers*, Oxford, UK: Clarendon Press, 1979.

[3] S. C. Pohlig, M. E. Hellman, "An Improved Algorithm for Computing Logarithms over GF(p) and its Cryptographic Significance", *IEEE Trans, Inform. Theory*, Vol IT-24, pp. 106-110, 1978.

The invention claimed is:

1. A decoding apparatus comprising:
 a network port in communication with a communication network which receives from the connection network an electromagnetic signal representative of encrypted data which were produced with a first computer relying on a difficulty of computing discrete logarithms;
 a non-transient memory in which is stored the electromagnetic signal representative of encrypted data which were encrypted by the first computer relying on the difficulty of computing discrete logarithms, the data having a discrete logarithm;
 a second computer in communication with the memory that decodes the encrypted data in the memory in a time of an order of log log p·log$^2$ p by computing the data's discrete logarithm, the second computer reduces the complexity of an exponential congruence which is defined modulo p, where p=2·p'+1, p' is also a prime and p'−1 contains only factors which are smaller than 100,000, and executes a sequence of reversible transformations supported by the non-transient memory in such a way that the exponential congruence module p is restated as a problem involving new relationships modulo p and a concurrent independent congruence modulo p−1; and
 a display on which the decoded encrypted data are displayed by the second computer.

2. A method for processing an electromagnetic signal representative of encrypted data which were produced relying on a difficulty of computing discrete logarithms, the data having a discrete logarithm, with a first computer comprising the steps of:
 receiving the encrypted data at a network port of a second computer from a communication network, the second computer in communication with the communication network;
 storing the encrypted data in a non-transient memory of the second computer;
 performing with the second computer in communication with the memory the computer-generated steps of decoding the encrypted data in the memory in a time of an order of log log p·log$^2$p by computing the data's discrete logarithms, the performing step includes the steps of reducing the complexity of an exponential congruence which is defined modulo p, where p=2·p'+1, p' is also a prime and p'−1 contains only factors which are smaller than 100,000; and executing with the second computer a sequence of reversible transformations supported by a non-transient memory in such a way that the exponential congruence modulo p is restated as a problem involving new relationships modulo p and a concurrent independent congruence modulo p−1; and
 displaying on a display the decoded data.

3. A computer program stored in a non-transient memory in communication with a second computer for decoding with the second computer an electromagnetic signal representative of encrypted data which is encrypted by a first computer relying on a difficulty of computing discrete logarithms, the data having a discrete logarithm, the computer program having the second computer-generated steps of:
 receiving the encrypted data by the first computer at a network port of the second computer from a communication network;
 storing the encrypted data in the non-transient memory;
 decoding the encrypted data in the memory with the second computer in a time of an order of log log p·log$^2$ p by computing the data's discrete logarithms, the decoding step includes the steps of reducing the complexity of an exponential congruence which is defined modulo p, where p=2·p'+1, p' is also a prime and p'−1 contains only factors which are smaller than 100,000; and executing with the second computer a sequence of reversible transformations supported by the non-transient memory in such a way that the exponential congruence modulo p is restated as a problem involving new relationships modulo p and a concurrent independent congruence modulo p−1; and
 displaying on a display the decoded data.

* * * * *

UNITED STATES PATENT AND TRADEMARK OFFICE
CERTIFICATE OF CORRECTION

PATENT NO. : 10,579,337 B1
APPLICATION NO. : 15/875737
DATED : March 3, 2020
INVENTOR(S) : Giorgio Coraluppi It is certified that error appears in the above-identified patent and that said Letters Patent is hereby corrected as shown below:

In the Specification

Column 1, Line 38, change "untraceable" to -- untractable --.

Column 1, Line 42, change "$p' = 2^{13} \cdot 5 \cdot 7 \cdot 11 \cdot 13 \cdot 17 \cdot 19 \cdot 23 \cdot 29 \cdot 31 \cdot 37 \cdot 41 \cdot 43 \cdot 47 \cdot 530.59 + 1$" to -- $p' = 2^{13} \cdot 5 \cdot 7 \cdot 11 \cdot 13 \cdot 17 \cdot 19 \cdot 23 \cdot 29 \cdot 31 \cdot 37 \cdot 41 \cdot 43 \cdot 47 \cdot 53 \cdot 59 + 1$ --.

Column 5, Line 54, change "$p_i$" to -- $\rho^l$ --.

Column 7, Line 8, replace "p" with -- $p_1$ --.

Column 7, Line 18, change "7'-" to -- $\tilde{r}$ --.

Column 7, Line 49, change "L" to -- $\tilde{u}$ --.

Column 8, Line 47, change "T" to -- V --.

Column 8, Line 47, change "$q_i^{\varepsilon_1}$" to -- $q_i^{\varepsilon_t}$ --.

Column 9, Line 41, change "$\varphi(e)$" to -- $\varphi(q_i^{\varepsilon_t})$ --.

Signed and Sealed this
Twenty-first Day of July, 2020

Andrei Iancu
*Director of the United States Patent and Trademark Office*